(12) United States Patent
Izumi et al.

(10) Patent No.: US 7,178,494 B2
(45) Date of Patent: Feb. 20, 2007

(54) VARIABLE VALVE TIMING CONTROLLER FOR INTERNAL COMBUSTION ENGINE

(75) Inventors: Kazunari Izumi, Obu (JP); Haruyuki Urushihata, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/248,251

(22) Filed: Oct. 13, 2005

(65) Prior Publication Data

US 2006/0081203 A1    Apr. 20, 2006

(30) Foreign Application Priority Data

Oct. 18, 2004    (JP)    ............................. 2004-302782

(51) Int. Cl.
*F01L 1/34*     (2006.01)
*F02D 13/04*    (2006.01)

(52) U.S. Cl. ................... 123/90.15; 123/321; 123/347

(58) Field of Classification Search ............. 123/90.15, 123/90.16, 90.17, 90.31, 321, 322, 347
See application file for complete search history.

(56) References Cited

U.S. PATENT DOCUMENTS

| 6,058,906 | A | * | 5/2000 | Yoshino | ..................... 123/295 |
|---|---|---|---|---|---|
| 6,213,070 | B1 | | 4/2001 | Hashimoto et al. | |
| 6,843,230 | B2 | * | 1/2005 | Iizuka et al. | ............ 123/406.46 |
| 6,851,409 | B2 | * | 2/2005 | Machida et al. | ............ 123/399 |
| 6,999,864 | B2 | * | 2/2006 | Iizuka et al. | ................ 701/103 |
| 2004/0015287 | A1 | * | 1/2004 | Ilzuka et al. | ................ 701/102 |
| 2004/0083999 | A1 | * | 5/2004 | Miyakoshi et al. | ...... 123/90.17 |
| 2005/0229896 | A1 | * | 10/2005 | Hori | ....................... 123/198 D |
| 2005/0278109 | A1 | * | 12/2005 | Ando | ......................... 701/112 |
| 2006/0042579 | A1 | * | 3/2006 | Izumi et al. | ............. 123/90.17 |

FOREIGN PATENT DOCUMENTS

JP    2002-364390    12/2002

\* cited by examiner

*Primary Examiner*—John T. Kwon
(74) *Attorney, Agent, or Firm*—Nixon & Vanderhye P.C.

(57) ABSTRACT

An ECU calculates an engine speed for calculating a camshaft phase based on a time period Tθ in which a crankshaft rotates a sampling angle θ. The camshaft phase is derived from a time difference between output timing of a cam angle signal and output timing of a crank angle signal based on the engine speed. According as the engine speed is lower, the sampling angle θ becomes small, so that the engine speed and the camshaft phase are precisely calculated.

2 Claims, 5 Drawing Sheets

VARIABLE VALVE TIMING CONTROLLER FOR INTERNAL COMBUSTION ENGINE

CROSS REFERENCE TO RELATED APPLICATIONS

This application is based on Japanese Patent Application No. 2004-302782 filed on Oct. 18, 2004, the disclosure of which is incorporated herein by reference.

FIELD OF THE INVENTION

The present invention relates to a variable valve timing controller which varies a rotational phase of a camshaft relative to a crankshaft of an internal combustion engine so that valve timing of an intake valve and/or an exhaust valve of an internal combustion engine is adjusted. The rotational phase of the camshaft relative to the crankshaft is referred to as a camshaft phase, hereinafter.

BACKGROUND OF THE INVENTION

A variable valve controller is mounted on an internal combustion engine in order to improve output and fuel efficiency and to reduce emission of the internal combustion engine. The variable valve timing controller varies the camshaft phase so that the valve timing of the intake valve and/or exhaust valve is adjusted.

Japanese Patent No. 3290427, which is a counterpart of U.S. Pat. No. 6,213,070, shows one of methods to detect the camshaft phase. In this method, a crank angle sensor outputs crank angle signals every when the crankshaft rotates a predetermined crank angel. A cam angle sensor outputs cam angle signals every when the intake camshaft rotates a predetermined camshaft angle. Rotational speed information is calculated based on the cam angle signals every when the camshaft rotates a predetermined sampling angle. The rotational speed information is, for example, a time period T110 in which the crankshaft rotates 110° CA. Based on the rotational speed information, a time difference between output timing of the crank angle signals and output timing of the cam angle timing is converted into a rotational angle difference in order to derive the camshaft phase.

It has been required that the valve timing is precisely adjusted even when the engine is cranking or idling in an extremely low speed. In the above-described method, the sampling angle is constant without respect to the engine speed. For example, the sampling angle is 110° CA. Thus, when the engine speed is extremely low, the fluctuation of the engine speed is increased, so that the accuracy of the camshaft phase is deteriorated because the sampling angle is too large. It is hard to adjust the valve timing precisely.

SUMMARY OF THE INVENTION

The present invention is made in view of the foregoing matter and it is an object of the present invention to provide a variable valve controller which can derive the camshaft phase precisely even when the engine speed is extremely low, so that the control accuracy of the valve timing is enhanced.

According to the variable valve controller of the present invention, the valve timing controller includes a crank angle sensor outputting a crank angle signal every when the crankshaft rotates a predetermined crank angle, a cam angle sensor outputting a cam angle signal every when the camshaft rotates a predetermined cam angle. A speed calculation means calculates a speed information which is a rotational speed or a physical amount relating to the rotational speed in which the crankshaft rotates a predetermined sampling angle based on the crank angle signal. A camshaft phase calculation means calculates a camshaft phase representing the rotational phase of the camshaft relative to the crankshaft based on the crank angle signal, a cam angle signal, and the speed information. A sampling angle varying means varies a sampling angel based on the speed information or a fluctuation of the speed information. The speed information is calculated by means of the speed calculation means every when the crankshaft rotates the sampling angle.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

Four embodiments of the present invention will be described hereinafter with reference to the drawings.

[First Embodiment]

A first embodiment will be described based on FIGS. 1 to 3.

Figure 1:
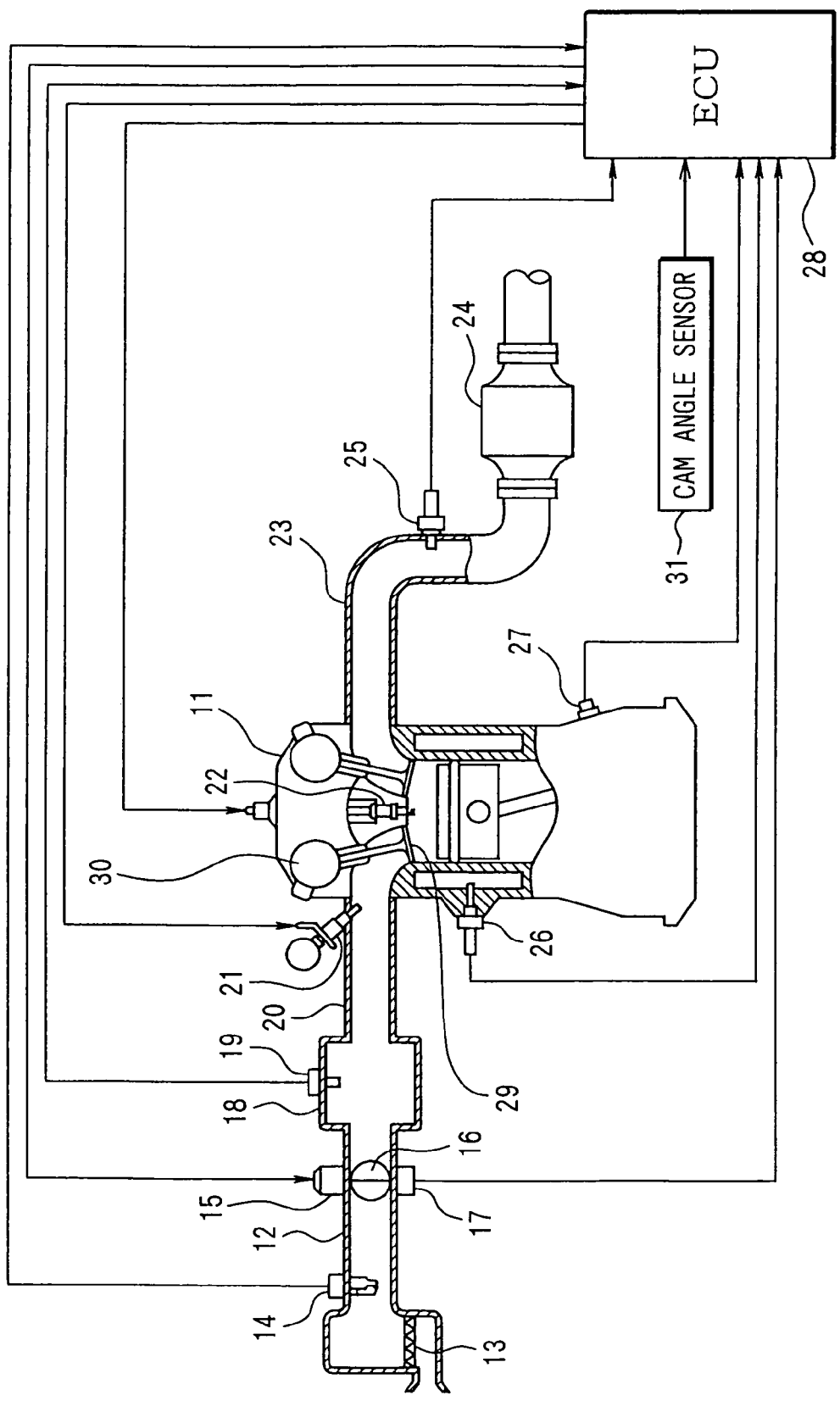
FIG. 1 is a schematic view of an engine control system.

Referring to FIG. 1, a structure of an engine control system is described hereinafter. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position are provided downstream of the air flow meter 14.

A surge tank 18 including an intake air pressure sensor 19 is provided down stream of the throttle valve 16. The intake air pressure sensor 19 detects intake air pressure. An intake manifold 20 is connected to the surge tank 18. A fuel injector 21 is mounted on the intake manifold 20 at a vicinity of an intake air port. A spark plug 22 is mounted on a cylinder head of the engine 11 corresponding to each cylinder to ignite air-fuel mixture in each cylinder. The spark plug generate spark to ignite a fuel-air mixture in the cylinder.

A valve timing controller 30 is connected to the intake air valve 29 of the engine 11. The valve timing controller 30 varies the camshaft phase in order to adjust the valve timing of the intake air valve 29.

An exhaust pipe 23 of the engine 11 is provided with a three-way catalyst 24 purifying CO, HC, and NOx in the exhaust gas. An exhaust gas sensor 25 (an air-fuel ratio sensor, an oxygen sensor) disposed upstream of the three-way catalyst 24 detects air-fuel ratio or rich/lean of the exhaust gas.

A coolant temperature sensor 26 detecting a coolant temperature and a crank angle senor 27 outputting a pulse signal every predetermined crank angle of a crankshaft of the engine 11 are disposed on a cylinder block of the engine 11. The crank angle and an engine speed are detected based on the output signal of the crank angle sensor 27.

A cam angle sensor 31 is provided around the intake air camshaft to output cam angle signals when the intake camshaft rotates a predetermined cam angle. The camshaft phase is derived based on the output signals from the cam angle sensor 31 and the output signals from the crank angle sensor 27.

The outputs from the above sensors are inputted into an electronic control unit 28, which is referred to an ECU hereinafter. The ECU 28 includes a microcomputer which executes an engine control program stored in a ROM (Read Only Memory) to control a fuel injection amount of a fuel injector 21 based on an engine running condition and an ignition timing of the spark plug 22.

The ECU 28 executes a variable valve timing control program so that the variable valve timing controller 30 makes the actual camshaft phase (actual valve timing) consistent with a target camshaft phase (target valve timing). At this time, the ECU 28 executes an engine speed calculation program shown in FIG. 2 so that the sampling angle $\theta$ is determined according to the engine speed NE. The ECU 28 calculates a time period T$\theta$, which is a time period for rotating the crankshaft by the sampling angle $\theta$, based on the crank angle signal when the crankshaft rotates by the sampling angle $\theta$. The engine speed NE is calculated based on the time period T$\theta$ in order to drive the camshaft phase.

Figure 3:
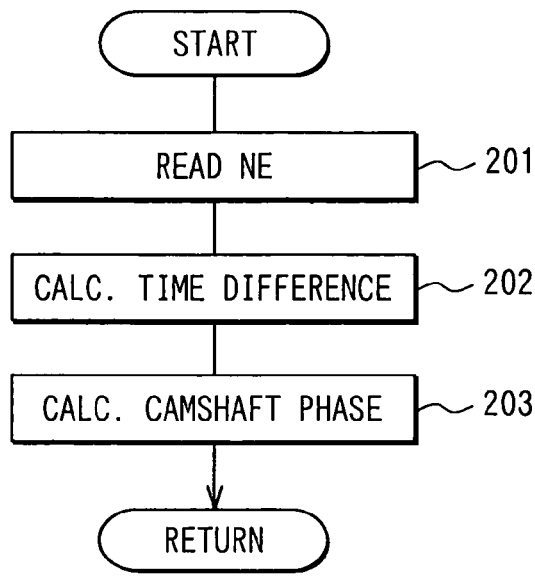
FIG. 3 is a flow chart showing a camshaft phase calculation program according to the first embodiment.

Furthermore, the ECU 28 executes a camshaft phase calculation program shown in FIG. 3 so that the camshaft phase (rotational phase of cam angle signal relative to crank angle signal) is derived by converting the time difference between the cranks angle signal relative to cam angle signal into a rotational angle difference.

Each program shown in FIGS. 2 and 3 will be described in detail hereinafter.

[Calculation of the Engine Speed]

Figure 2:
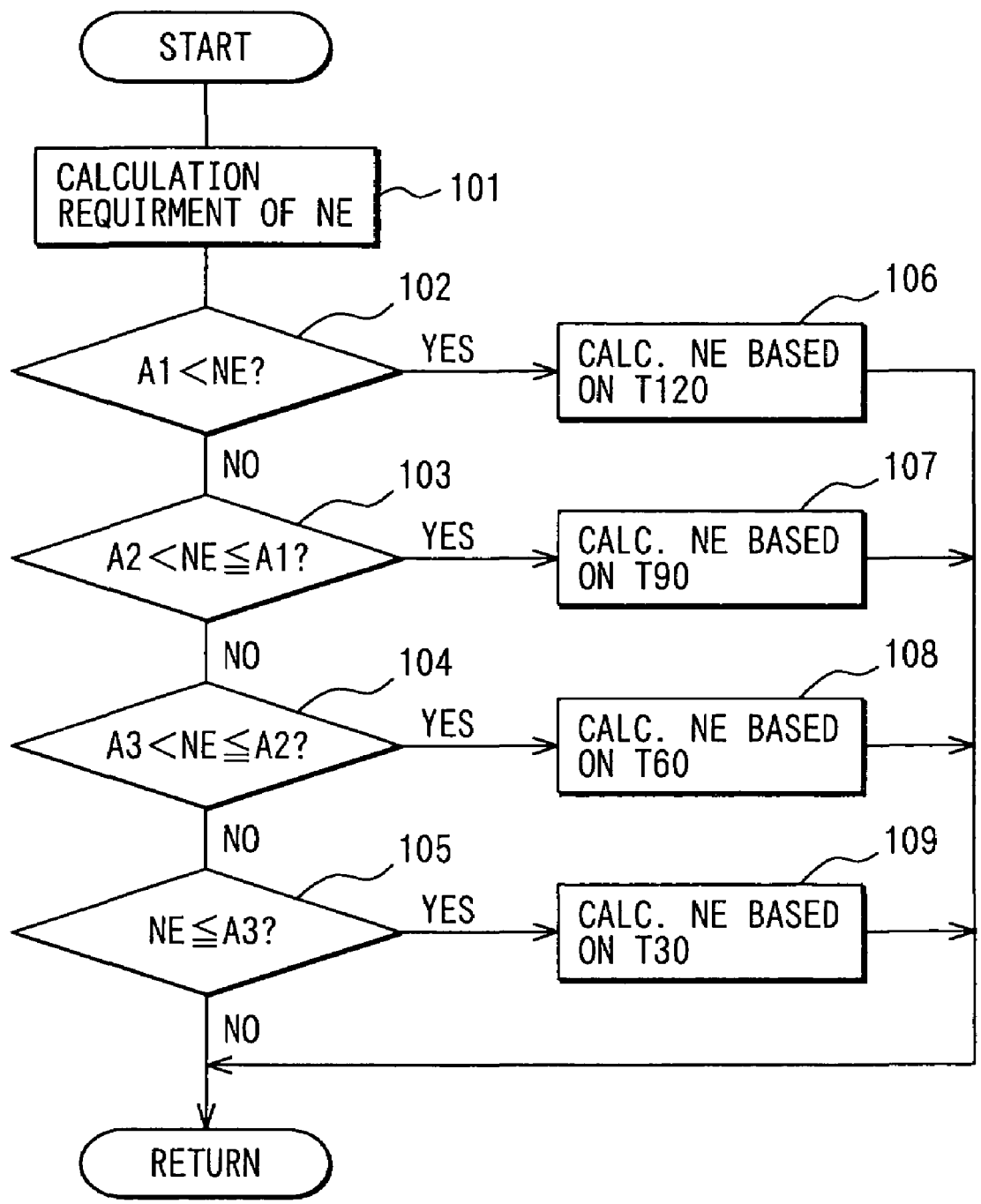
FIG. 2 is a flow chart showing an engine speed calculation program according to a first embodiment of the present invention.

The engine speed calculation program, which is shown in FIG. 2, for deriving the camshaft phase is executed every predetermined crank angle (for example, 30° CA) while the ECU 28 is energized.

In step 101, a requirement for calculating the engine speed NE is generated. In steps 102–105, the computer determines a range of engine speed NE.

When the computer determines that the engine speed NE is greater than a preset value A1 in step 102 (A1<NE), the procedure proceeds to step 106 in which the sampling angle $\theta$ is set to 120° CA, the time period T120 is calculated every 120° CA, and the engine speed NE is calculated based on the time period T120.

When the computer determines the engine speed NE is equal to or less than the preset value A1 and greater than a preset value A2 (A2<NE≦A1), the procedure proceeds to step 107 in which the sampling period $\theta$ is set to 90° CA, the time period T90 is calculated every 90° CA, and the engine speed NE is calculated based on the time period T90.

When the computer determines the engine speed NE is equal to or less than the preset value A2 and greater than a preset value A3 (A3<NE≦A2), the procedure proceeds to step 108 in which the sampling angle $\theta$ is set to 60° CA, the time period T60 is calculated every 60° CA, and the engine speed NE is calculated based on the time period T60.

When the computer determines the engine speed NE is less than the preset value A3 (NE≦A3), the procedure proceeds to step 109 in which the sampling angle $\theta$ is set to 30° CA, the time period T30 is calculated every 30° CA, and the engine speed NE is calculated based on the time period T30.

By executing procedures in steps 102–109, according as the engine speed NE becomes smaller, the sampling angle $\theta$ becomes small. Even when the engine speed NE is low, in which fluctuation of engine speed NE is large, the engine speed NE is accurately calculated.

[Calculation of Camshaft Phase]

A camshaft phase calculation program shown in FIG. 3 is executed every predetermined time (for example, every eight microseconds) while the engine ECU 28 is energized.

In step 201, the engine speed NE, which is calculated by executing the program shown in FIG. 2, is read. Then, the procedure proceeds to step 203 in which the camshaft phase is calculated by converting the time difference between output timing of the cam angle signal and that of the crank angle signal into the rotational angle difference.

In the first embodiment described above, according as the engine speed NE becomes smaller, the sampling angle $\theta$ becomes small, so that the engine speed NE is precisely calculated. Thus, even when the fluctuation of engine speed is relatively large, the camshaft phase is accurately calculated, so that the valve timing can be also precisely adjusted.

[Second Embodiment]

Figure 4:
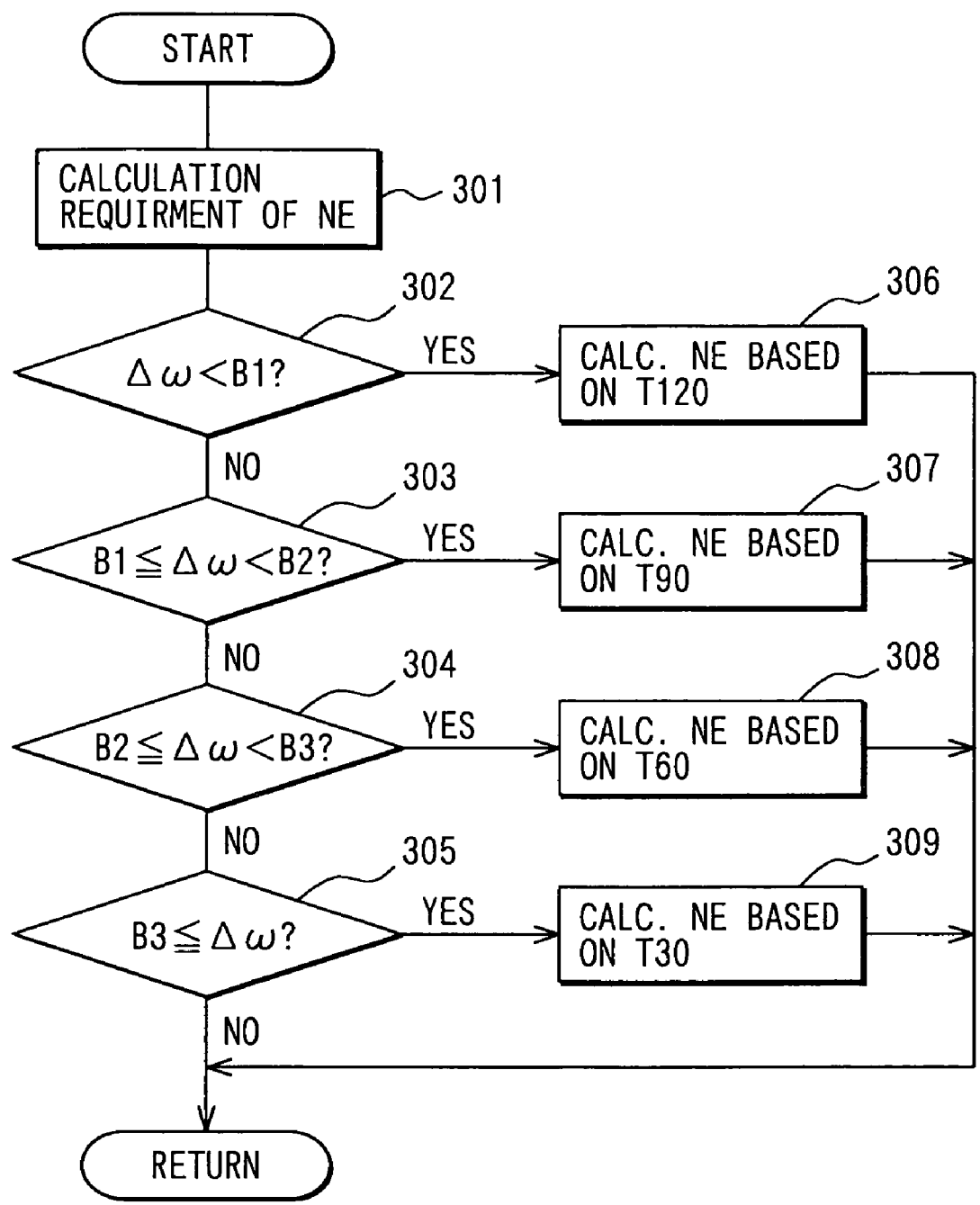
FIG. 4 is a flow chart showing an engine speed calculation program according to a second embodiment.

Referring to FIG. 4, a second embodiment will be described hereinafter.

In the second embodiment, according as a variation of engine speed $\Delta\omega$ becomes larger, the sampling angle $\theta$ becomes small by executing a program shown in FIG. 4.

In step 301, a requirement for calculating the engine speed NE is generated. In steps 302–305, the computer determines a range of engine speed NE.

When the computer determines that the variation $\Delta\omega$ of engine speed is greater than a preset value B1 in step 302 ($\Delta\omega$<B1), the procedure proceeds to step 306 in which the sampling angle $\theta$ is set to 120° CA, the time period T120 is calculated every 120° CA, and the engine speed NE is calculated based on the time period T120.

When the computer determines the variation $\Delta\omega$ of engine speed is equal to or more than the preset value B1 and less than a preset value B2 (B1<NE≦B2), the procedure proceeds to step 307 in which the sampling period $\theta$ is set to 90° CA, the time period T90 is calculated every 90° CA, and the engine speed NE is calculated based on the time period T90.

When the computer determines the variation $\Delta\omega$ of engine speed is equal to or more than the preset value B2 and less than a preset value B3 (B2≦$\Delta\omega$<B3), the procedure proceeds to step 308 in which the sampling angle $\theta$ is set to 60° CA, the time period T60 is calculated every 60° CA, and the engine speed NE is calculated based on the time period T60.

When the computer determines the variation $\Delta\omega$ of engine speed is more than the preset value B3 (B3≦$\Delta\omega$), the procedure proceeds to step 309 in which the sampling angle $\theta$ is set to 30° CA, the time period T30 is calculated every 30° CA, and the engine speed NE is calculated based on the time period T30.

By executing procedures in steps 302–309, according as variation $\Delta\omega$ of engine speed becomes larger, the sampling angle θ becomes small. Even when variation Δω of engine speed is relatively large, the engine speed NE is accurately calculated.

[Third Embodiment]

Figure 5:
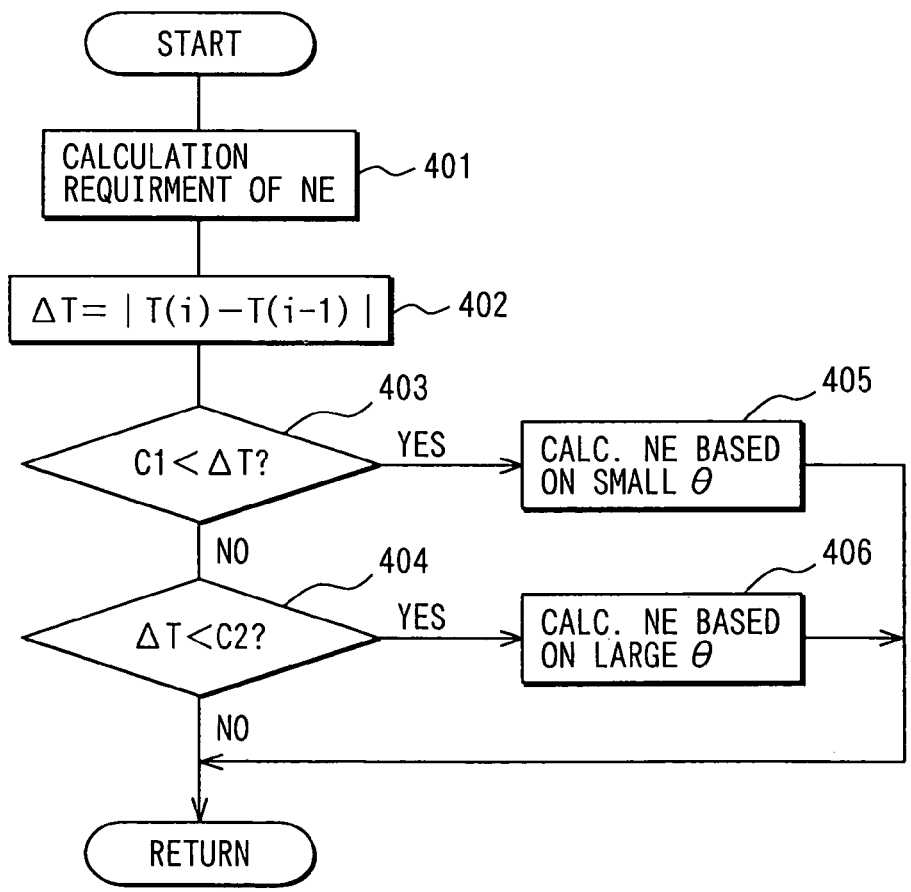
FIG. 5 is a flow chart showing an engine speed calculation program according to a third embodiment.

Referring to FIG. 5, a third embodiment will be described.

The ECU 28 has a function as a crank counter which counts the crank angle signals outputted from the ck angle sensor 27. By executing the programs shown in FIG. 5, according as a variation ΔT of a count-up period becomes larger, the sampling angle θ becomes large. The count-up period corresponds to a time period in which the crank counter counts up by one.

In step 401, a requirement for calculating the engine speed NE is generated. Then, procedure proceeds to step 402 in which the variation ΔT of the count-up period is calculated based on the following equation.

$$\Delta T = |T(i) - T(i-1)|$$

wherein T(i) is a current count-up period, and T(i−1) is a previous count-up period.

Then, the procedure proceeds to step 403 in which the computer determines whether the variation ΔT of the count-up period is larger than a preset value C1. When the answer is Yes in step 403, the procedure proceeds to step 405 in which the sampling angle θ is decreased by 30° CA from the previous value and the time period Tθ is calculated to calculate the engine speed NE. A lower limit of the sampling angle θ is 30° CA.

When the computer determines the variation ΔT of the count-up period is less than the preset value C1, the procedure proceeds to step 404 in which the computer determines whether the variation ΔT of the count-up period is less than the preset value C2. When the answer is Yes in step 404, the procedure proceeds to step 406 in which the sampling angle θ is increased by 30° CA from the previous value and the time period Tθ is calculated to calculate the engine speed NE.

In the third embodiment, in the area the variation of engine speed becomes large, the sampling angle θ becomes small to accurately calculate the engine speed NE. Thus, the camshaft phase is accurately calculated to control the valve timing.

[Fourth Embodiment]

At the time of calculating the camshaft phase, the calculated engine speed NE is not always based on the updated crank angle signals due to a calculation period of the engine speed NE and the camshaft phase. Even if the camshaft phase is calculated based on the engine speed NE which has been calculated just before the camshaft phase is, when the engine speed NE is not based on the updated crank angle signals, the camshaft phase cannot be precisely calculated.

Figure 6:
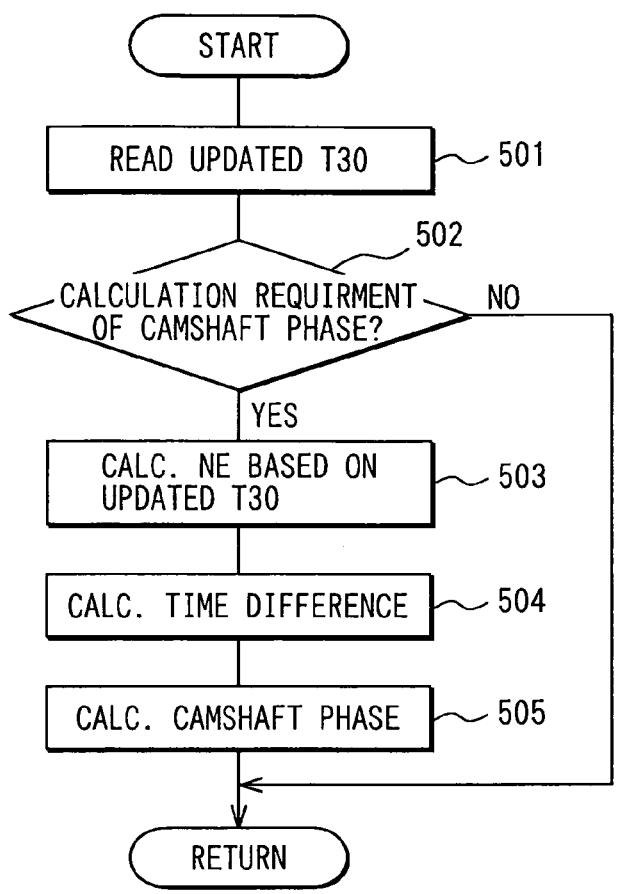
FIG. 6 is a flowchart showing a camshaft phase calculation program according to a fourth embodiment.
Figure 7:
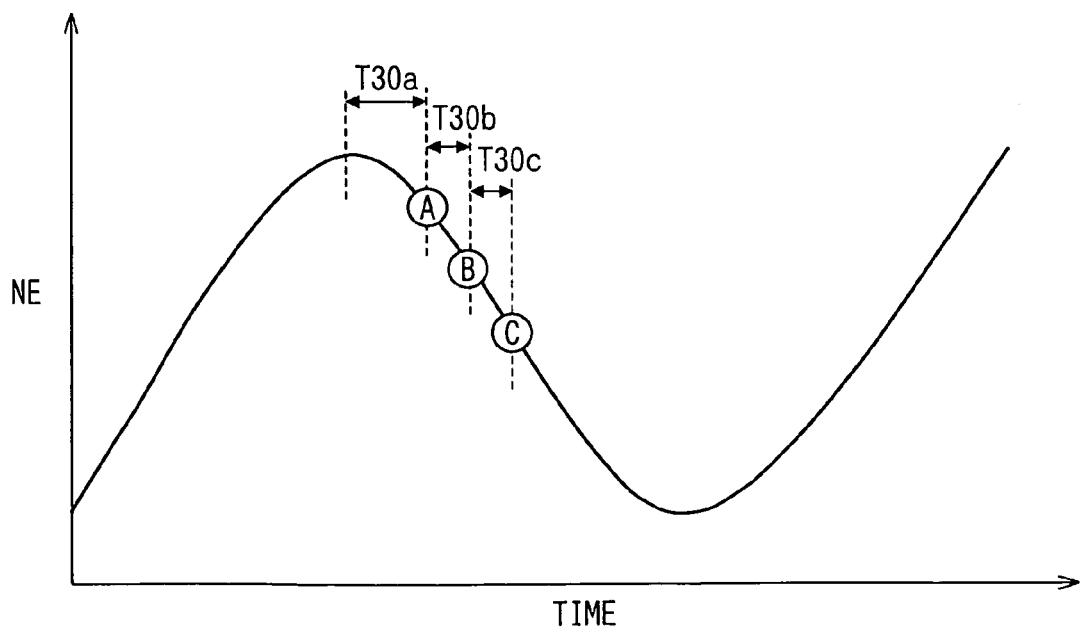
FIG. 7 is a time chart for explaining a calculation method of the camshaft phase according to the fourth embodiment.

In a fourth embodiment, by executing a program shown in FIG. 6, the engine speed NE is calculated by means of the updated time period T30 which is calculated based on the updated crank angle signal at the calculating timing of the camshaft phase as shown in a time chart of FIG. 7.

The program shown in FIG. 6 is executed every predetermined time (for example eight microseconds) while the ECU 28 is on. In step 501, the updated time period T30, which is calculated based on the updated crank angle signals, is read. The time period T30 is a time period in which the crankshaft rotates 30° CA.

Then, the procedure proceeds to step 502 in which the computer determines whether a requirement for calculating the camshaft phase is generated. When the answer is Yes in step 502, the procedure proceeds to step 503 in which the engine speed NE is calculated based on the updated time period T30.

Then, the procedure proceeds to step 504 in which a time difference between output timing of the crank angle signals and that of the cam angle signals. In step 505, the time difference is converted into an angle difference to obtain the crankshaft phase by means of the engine speed NE.

According to the fourth embodiment, since the camshaft phase is calculated based the updated engine speed NE, which is based on the updated crank angle signals, the camshaft phase is precisely calculated so that the valve timing is precisely controlled.

In the fourth embodiment, the camshaft phase may be calculated based on the updated crankshaft signals when a difference between the camshaft phase and the target camshaft phase becomes less than a predetermined value.

In the first to fourth embodiments, the time difference between output timing of cranks angle signals and that of cam angle signals is converted into an angle difference to obtain the camshaft phase. Alternatively, the camshaft phase may be obtained by means of information relating to the engine speed NE, such as the time period Tθ.

What is claimed is:

1. A variable valve timing controller for an automobile, the valve timing controller varying rotational phase of a camshaft relative to a crankshaft to adjust valve timing of an intake valve and/or an exhaust valve, the valve timing controller comprising:

a crank angle sensor outputting a crank angle signal when the crankshaft rotates through a predetermined crank angle;

a cam angle sensor outputting a cam angle signal when the camshaft rotates through a predetermined cam angle;

speed calculation means for calculating speed information which is related to rotational speed of the crankshaft based on the crank angle signal;

camshaft phase calculation means for calculating camshaft phase representing rotational phase of the camshaft relative to the crankshaft based on the crank angle signal, a cam angle signal, and the speed information; and sampling angle varying means for varying a sampling angle based on the speed information or fluctuation of the speed information, wherein the speed information is calculated by the speed calculation means when the crankshaft rotates through the sampling angle.

2. A variable valve timing controller for an automobile according to claim 1, further comprising:

a crank counter counting the crank angle signal, wherein the speed information or a fluctuation of the speed information is estimated based on an operation of the crank counter.

* * * * *